United States Patent
Hall et al.

(10) Patent No.: US 11,428,035 B2
(45) Date of Patent: Aug. 30, 2022

(54) SYSTEMS AND METHODS FOR AVOIDING INTERFERENCE BETWEEN AN OVERHEAD DOOR AND A LIFTER

(71) Applicant: Hall Labs LLC, Provo, UT (US)

(72) Inventors: David R. Hall, Provo, UT (US); Jerome Miles, Spanish Fork, UT (US); Daniel Madsen, The Vineyard, UT (US)

(73) Assignee: Hall Labs LLC., Provo, UT (US)

( * ) Notice: Subject to any disclaimer, the term of this patent is extended or adjusted under 35 U.S.C. 154(b) by 0 days.

(21) Appl. No.: 16/889,453

(22) Filed: Jun. 1, 2020

(65) Prior Publication Data
US 2021/0372189 A1    Dec. 2, 2021

(51) Int. Cl.
*E05F 15/00*       (2015.01)
*E05F 15/40*       (2015.01)
*E05F 15/668*     (2015.01)

(52) U.S. Cl.
CPC ............ *E05F 15/40* (2015.01); *E05F 15/668* (2015.01); *E05Y 2400/32* (2013.01); *E05Y 2400/54* (2013.01); *E05Y 2400/86* (2013.01); *E05Y 2900/106* (2013.01); *E05Y 2900/132* (2013.01)

(58) Field of Classification Search
CPC ....... E05F 15/77; E05F 15/668; E05F 15/665; E05F 15/676; E05F 15/686; G07C 2009/00928; G07C 2009/00769; E05Y 2900/106; H04M 11/007; H04L 12/28; H04W 4/80; H04B 17/318
USPC ................................ 49/31, 26, 28, 119, 123
See application file for complete search history.

(56) References Cited

U.S. PATENT DOCUMENTS

| | | | |
|---|---|---|---|
| 8,587,404 B2* | 11/2013 | Laird | E05F 15/684 340/5.7 |
| 9,879,466 B1* | 1/2018 | Yu | G06K 9/4604 |
| 9,984,561 B1* | 5/2018 | Swafford | G08C 17/02 |
| 9,986,102 B1* | 5/2018 | Hall | H04L 12/28 |
| 10,563,456 B2* | 2/2020 | Bodurka | G05B 19/042 |
| 10,846,956 B2* | 11/2020 | Cate | G07C 9/00182 |
| 10,907,398 B2* | 2/2021 | Cate | E05F 15/77 |
| 11,028,633 B2* | 6/2021 | Fitzgibbon | E05F 15/73 |
| 2016/0258202 A1* | 9/2016 | Scalisi | G07C 9/00309 |
| 2019/0048644 A1* | 2/2019 | Lickfelt | E05F 15/73 |
| 2020/0240198 A1* | 7/2020 | Cate | H04W 4/022 |
| 2020/0242862 A1* | 7/2020 | Cate | G07C 9/00182 |
| 2021/0270082 A1* | 9/2021 | Hall | E05F 15/77 |

* cited by examiner

*Primary Examiner* — Chi Q Nguyen

(57) ABSTRACT

Systems and methods for operating an overhead door opener and a lifter are disclosed. The lifter is positioned above the overhead door when the overhead door is in a retracted position and raises and lowers objects along a path that, without care, will intersect with the overhead door. A controller monitors the position of the overhead door and the lifter and moves the overhead door if the lifter is out of the way, and if the lifter is not out of the way the command is not executed to prevent interference between the lifter and the overhead door.

16 Claims, 4 Drawing Sheets

SYSTEMS AND METHODS FOR AVOIDING INTERFERENCE BETWEEN AN OVERHEAD DOOR AND A LIFTER

CROSS-REFERENCE TO RELATED APPLICATIONS

This application claims priority to U.S. Provisional Patent Application No. 62/884,128 entitled GARAGE DOOR OPENER AND STORAGE SYSTEM filed on Aug. 7, 2019 and is incorporated herein by reference in its entirety.

TECHNICAL FIELD

This application relates to operating lifting devices such as in a garage in concert with opening and closing the door to the garage without interference.

BACKGROUND

Garages are a useful place to store objects. Much of the space in a garage is overhead. Storing items overhead is a good use of the space in a garage. One difficulty for storing objects overhead in a garage is that the garage door opens into the garage, this can limit what objects can be stored over the garage door opener as objects that hang too low interfere with the opening of the garage door. One way of storing objects overhead is to lift and lower them with lifting devices such as winches.

SUMMARY

Embodiments of the present disclosure are directed to a system including an overhead door opener configured to raise and lower an overhead door in response to receiving a command to open or close the door. The overhead door is movable between a retracted position and a deployed position and the retracted position is above and behind the deployed position. The system also includes a lifter positioned above the overhead door when the overhead door is in the retracted position and lifter is configured to raise and lower an object along a path that would intersect with a portion of the overhead door when the overhead door is in the retracted position. The system also includes a controller configured to monitor a position of the overhead door along a first path and a position of the lifter along a second path. The first and second path intersect. The controller is configured to receive a command to move one of the lifter or the overhead door, and before executing the command, checking the position of the other of the overhead door and the lifter to determine whether or not executing the command will cause interference between the overhead door and the lifter. If the position of the overhead door and lifter are suitable to avoid interference, executing the command.

Other embodiments of the present disclosure are directed to a method of operating an overhead door and lifter in concert to avoid interference between the overhead door and lifter. The method includes storing a position of an overhead door along a first path defined between a deployed position and a retracted position, and storing a position of a lifter along a second path. The lifter comprises comprising a motorized lifting device configured to raise and lower an object along the second path. The second path is defined between a raised position and a lowered position. The method also includes storing a safe portion and unsafe portion of each of the first and second path where if the overhead door or lifter is in the safe portion the other can be moved without interference. If the overhead door or lifter is in the unsafe portion the other cannot be moved without interference. The method also includes receiving a command to move the overhead door along the first path, checking the position of the lifter, and if the lifter is in the unsafe position, declining the command to move the overhead door. The method also includes executing the command to move the overhead door if the lifter is in the safe position.

Further embodiments of the present disclosure are directed to a kit for operating an overhead door opener with a lifter in concert. The kit includes a lifter comprising a powered lifting device and associated hoisting and connection equipment configured to suspend an object. The lifting device is configured to raise and lower the object in response to commands. The kit also includes a controller configured to monitor a relative position of an overhead door and the lifter to prevent interference between the overhead door and the lifter, the controller being located near a button on an overhead door opener, the controller further comprising an articulating finger configured to manually depress the button to raise and lower the overhead door. The controller is configured to receive a remote request to open the overhead door, and in response to the request the controller moves the overhead door if the lifter is not in an impeding position relative to the overhead door. The controller moves the overhead door by mechanically actuating the articulating finger to depress the button.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
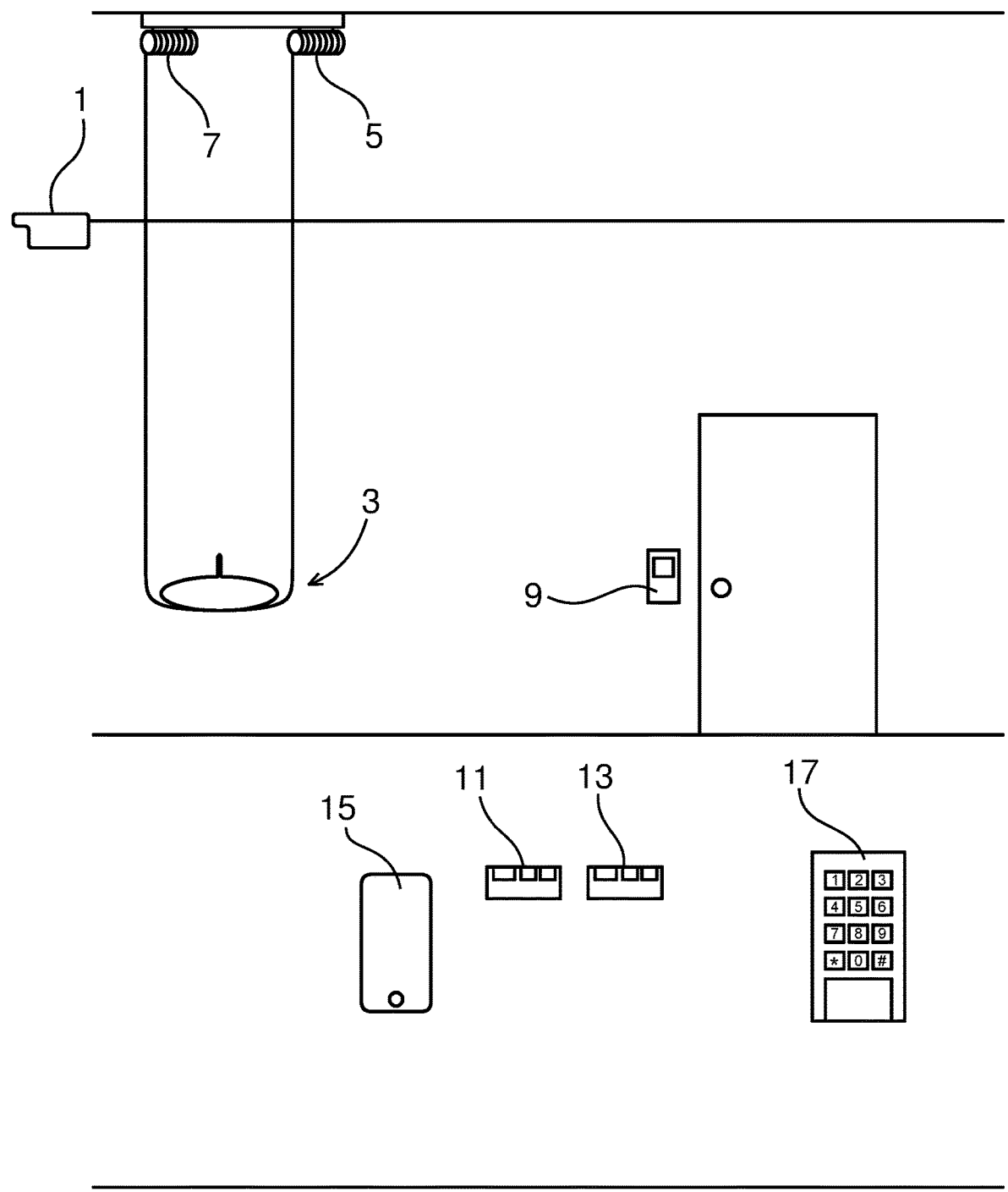
FIG. 1 is a view of a garage with an integrated garage door opening and lifter storage system installed.

The following description recites various aspects and embodiments of the inventions disclosed herein. No particular embodiment is intended to define the scope of the invention.

Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "garage door" is meant to refer to garage doors, utility doors, and other similar doors including track mounted articulated doors, rolling doors, warehouse doors, or any other automated door. Some of these doors open vertically, some horizontally. Examples of these doors are found in residential garages, storage facilities, distribution centers, warehouses, automotive shops. Overhead door and garage door are interchangeable.

As used herein, "garage door operator" is meant to refer to the machine or mechanism which opens and closes the door of the garage.

As used herein, "winch" or "lifting device" is meant to refer to devices with a motor attached to a drum for winding a line onto. One example of such lifting devices is available from MyLifter® and are described in U.S. Pat. Nos. 9,399,566; 9,567,195; 9,975,745 the contents of which are incorporated by reference.

As used herein, "lifter" is meant to refer to kits designed to lift specific objects, such as a paddleboard lifter is used to lift a paddleboard. The lifter utilizes at least one lifting device to lift, lower, and store objects. Lifter is also meant to refer to a single lifting device being used to lift and store objects even if it was not designed for use with a specific object. "Lifter" can also refer to any object being raised and/or lowered by the winch or lifting device, including specific items, and storage units or other equipment.

A system for lifting objects and storing them overhead safely is described. The system includes lifting devices for raising objects overhead and storing them there. The lifting devices may attach to an overhead mounting system such as that described in U.S. Pat. No. 9,939,105. Some lifting devices are included in kits for use with specific objects such as kayaks, the hard top of a jeep, bicycles, platforms, and other objects. Other lifting devices are not included with a specific kit and are used according to the owner's best wishes and imagination.

Using lifting devices such as those previously described is an effective way of storing objects out of the way while still keeping them accessible. A challenge to their use can occur when the lifters are installed in locations where a moving object, such as an overhead door or a a garage door, would come into contact with the lines of the lifting devices when they are lowered. For example, a kayak storage lifter is installed above an overhead door. The mother of a family closes the garage door and lowers the kayak. The father comes home and opens the garage door. As the garage door opens the garage door comes in contact with the lines of the kayak lifter. The lines of the kayak lifter are carried by the garage door and the kayak is dragged and then lifted by the lines encountering the garage door. Not only is this bad for the kayak it is unsafe for anyone in the garage.

Utilizing winches to store objects overhead is a relatively recent development in the storing objects in a garage. The use of winches is advantageous because it makes it possible to store items overhead while maintaining their accessibility. Most modern garages have safety features that prevent the door from closing on objects or individuals who are underneath the door. Typically, this occurs through the use of an optical sensor that when interrupted causes the door to stop. Additional safety features include the door raising again and alarms signaling that there is something in the way of the door. Comparable safety features are not present for when the door is being raised.

The present disclosure ensures that the garage door cannot open when a lifting device is in the lowered configuration. There are two ways to implement the system. First, the garage door opener is part of an integrated system made by GarageSmart®, where the garage door opener communicates with the lifting devices. Second, when the lifting devices are used with an overhead door opener other than that made by GarageSmart®, a device for pressing the button on the garage door opener is utilized, and the device can ensure there will not be any interference between the lifting device and the garage door.

The garage door opening mechanism and the winches are all a part of an integrated system. Each device connects to the others wirelessly. There are several methods of wireless connection, such as Bluetooth, WIFI, and radio frequency. In the preferred embodiment the devices all communicate through Bluetooth. Most modern garage door opening systems include several methods for opening the garage. These methods include wall mounted buttons or switches, remote garage door openers, and numeric keypads. Additionally, many systems are including the ability to use an app on a smartphone to open the garage. Generally, the wall mounted button or switch within the garage is a wired connection to the garage door opening mechanism. Increasingly, other methods of opening the garage are relying on wireless methods to convey those commands.

The integrated system such as that developed by GarageSmart® enables the garage door opening mechanism to communicate with the winches and includes checks to ensure that the garage door will not open when the lines connected to the winches are in a lowered state.

Turning to FIG. 1, which is a view into a garage equipped with a GarageSmart® garage door opening mechanism 1, and a kayak lifter 3 equipped with 2 lifting devices 5 and 7. The wall mounted button 9 opens and closes the garage door. Remote garage door openers 11 and 13 enable remote opening and closing of the garage door. Smartphone 15 is configured with an app to also allow remote opening and closing of the garage door. The numeric keypad 17 also wirelessly connects to the garage door opening mechanism 1.

In addition to including a wireless transceiver, the device such as the garage door operator 1 and lifting devices 5 and 7 also include a processors and memory. The processors in the lifting devices 5 and 7 monitor how much of the lines are let out from the winches. The processor in the garage door operator 1 enables the garage door operator 1 to perform tasks such as determining not to open the garage when the lines of the lifting devices 5 and 7 of the kayak lifter 3 are let out. The lifting devices are configured to be remotely controlled. Preferably, the remote control is a smartphone with an app configured for the lifting devices.

An example of the system in use will be helpful in understanding how it functions. When the button of remote garage door opener 11 is pressed, the remote opener 11 sends a signal to the garage door operator 1. This check begins the process and ensures that the lifters are not in the way of the garage door as it is opened. The garage door operator 1 sends a signal to the lifting devices 11 and 13 of the kayak lifter. The signal incudes a query as to the location of the ends of the lines of the lifting devices. One or more of the encoders, processors, and memory of the lifting devices 11 and 13 track the location of the end of the line. This allows the lifting devices 11 and 13 to communicate with the garage door operator 1 the location of the ends of the lines. If the lifting devices 11 and 13 communicate that the lines are completely spooled in, the processor of the garage door operator will instruct the garage door operator 1 to open the garage door.

Figure 2:
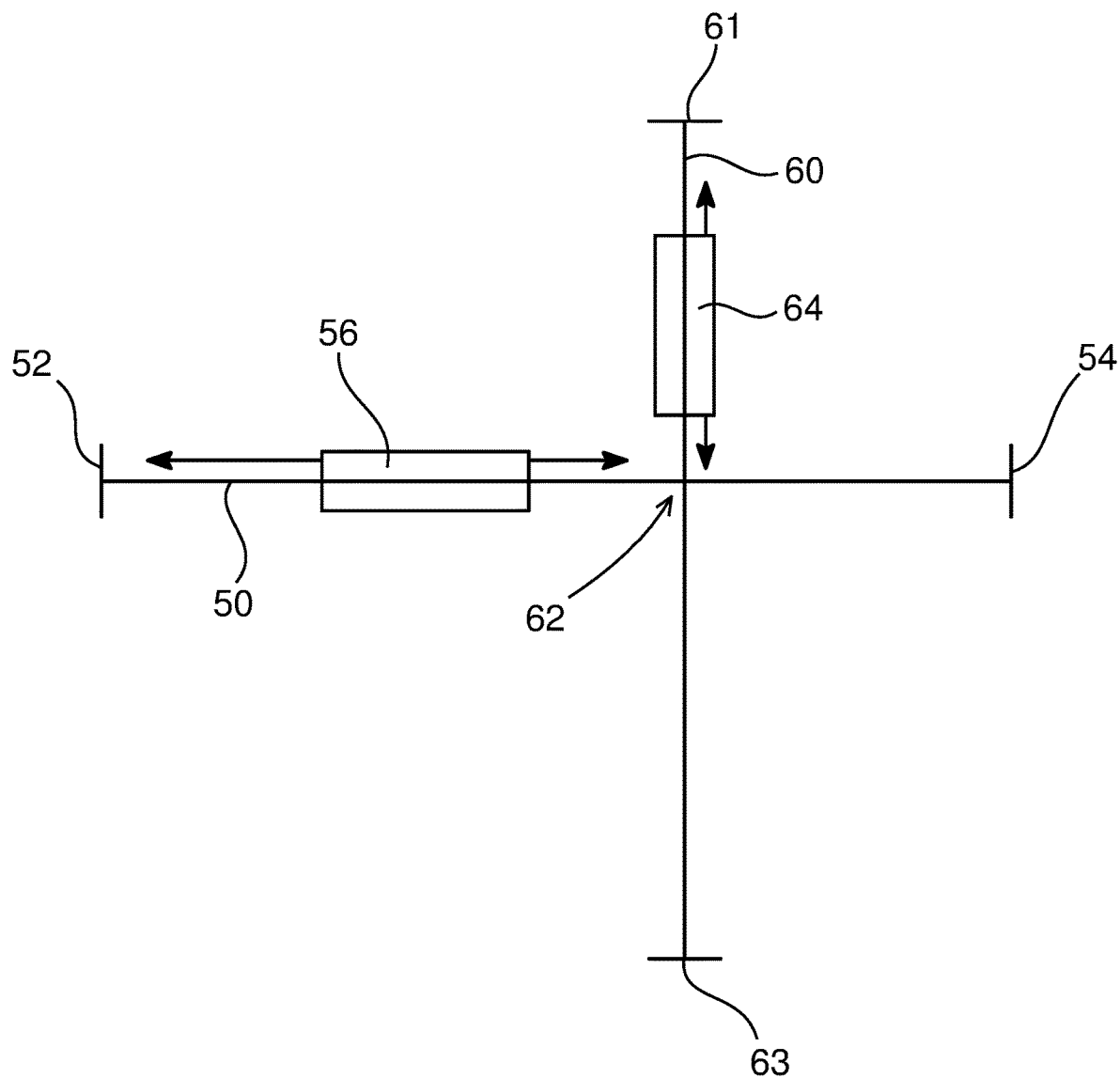
FIG. 2 is a schematic illustration of a path of a lifting device and a path of an overhead door according to embodiments of the present disclosure.

FIG. 2 is a schematic illustration of the path 50 of a lifting device and a path 60 of an overhead door according to embodiments of the present disclosure. The paths are shown as linear paths that cross at 62. In reality, the path of an overhead door may not be linear. The path of a hanging object being raised and lowered by a lifter however, may be linear. An object 56 travels along the path 50 between a first end 52 representing a retracted position, and a second end 54 representing a deployed position. For purposes of explanation suppose this object 56 is a kayak and associated cables, etc. A second object 64 travels along path 60 between a first end 61 representing a retracted position (in the case of a door, an opened door) and a second end 63 representing a deployed position (in the case of a door, the door is closed). When a command is issued, either to the lifter or the door, a check is performed to determine whether or not the position of one of these objects 56 and 64 will prevent the other from operating. If the position of the objects 56 and 64 does not prevent the desired action, the command is executed; however, if the position of either object 56 or 64 prevents the desired action, the command is not executed. An alarm or notification can be issued accordingly.

The objects 56 and 64 both have a length occupying not a point, but a space along each path. In some embodiments the leading edge of the objects can be defined as where intersection will occur, but in other embodiments the objects may have a leading edge and a trailing edge, resulting in more than one "safe" zone in which the command may be executable. In some embodiments the user can define the safe zone using a graphical user interface, or by pressing buttons on the smartphone or other device that operates the garage door or the lifting devices.

If either the garage door opener or lifter is currently moving when the command is received, the command can be held in abeyance until the motion has stopped, at which point the command can be checked as described above.

The lifting devices 11 and 13 may communicate that the lines are completely spooled out, the processor of the garage door operator 1 will instruct the garage door operator 1 not to open the garage door. The lifting devices 11 and 13 may also communicate that the garage door operator is at some intermediate position, the lifting devices 11 and 13 or the garage door operator 1 may determine whether or not it is safe to move the garage door. A first portion of the path can be defined as "safe" in which there will be no interference between the garage door and any object suspended by the lifting devices (such as a kayak 3), and a second portion can be defined as "unsafe." The command to operate the garage door 1 will proceed if the lifter is in the "safe" zone, and will not proceed if the lifter is not in the "safe" zone. In many embodiments the safe zone includes an end of the line up to some intermediate point, and the unsafe zone continues from that point on to the other extreme. However, it is possible for a lifting device to have more than one discrete safe areas in which the garage door may be operated without interference.

Each time the garage door is opened a check is performed. Some or all of the methods for opening the garage door may require this check. If the check indicates that a lifter is in the way of the garage door the garage door will not open.

The system works in the other direction as well. The lifter may be controlled remotely via an app on a smartphone. In other embodiments a dedicated remote control device is used. To lower the lifter a virtual button is pushed on a smartphone. The smartphone sends a signal to garage door operator to determine the location of the door. The garage door operator includes encoders to precisely track the location of the garage door. When the garage door operator receives the signal querying the location of the garage door it responds to the app on the smartphone the location of the garage door. If the garage door is open the app on the smartphone will send another signal instructing the lifting devices to not lower the paddleboard lifter. Alternatively, if the garage door operator indicates that the garage door is closed the app on the smartphone will instruct the lifting devices to lower the paddleboard lifter.

The embodiment described herein has utilized a single paddleboard lifter. However, the system is capable of using multiple lifters and there are multiple lifters available for lifting specific objects, including; jeep hard tops, truck caps, bicycles, kayaks, paddleboards, and many other objects.

The app on a smartphone for controlling the lifting devices includes functionality for setting several positions. The controls for the kayak lifter allow for setting at least a high set point and a low set point. It is also possible to set additional mid set points.

There are times when it will be beneficial to set a high set point that is not the same as the line of the lifters being fully spooled in. When a high set point has been programed, that high set point will serve as a permissible height for the kayak to be lifted and have the processor of the garage door operator allow the garage to close.

Many people have already invested in up to date garage door opening systems and will not want to spend the money to replace such as system. Wireless protocols are company specific and many companies make the protocols to control their devices unavailable to others. This is beneficial to the company, because anyone using their system will have to keep using products compatible with the system they own. However, consumers who wish to use the devices of multiple systems together will encounter difficulties in getting the different systems to communicate with one another. An adapter or retrofit kit has been developed that enables continued use of the preinstalled garage door opening system along with the lifter kits for overhead storage, Often the wall mounted button or switch for an overhead door opening machine is hardwired to the machine. There is no wireless protocol for enabling the garage door opening machine to open the garage door when the hardwired button is pushed. The inventors have used this fact to their advantage in creating a way for a garage storage system to work in conjunction with an overhead door.

Figure 3:
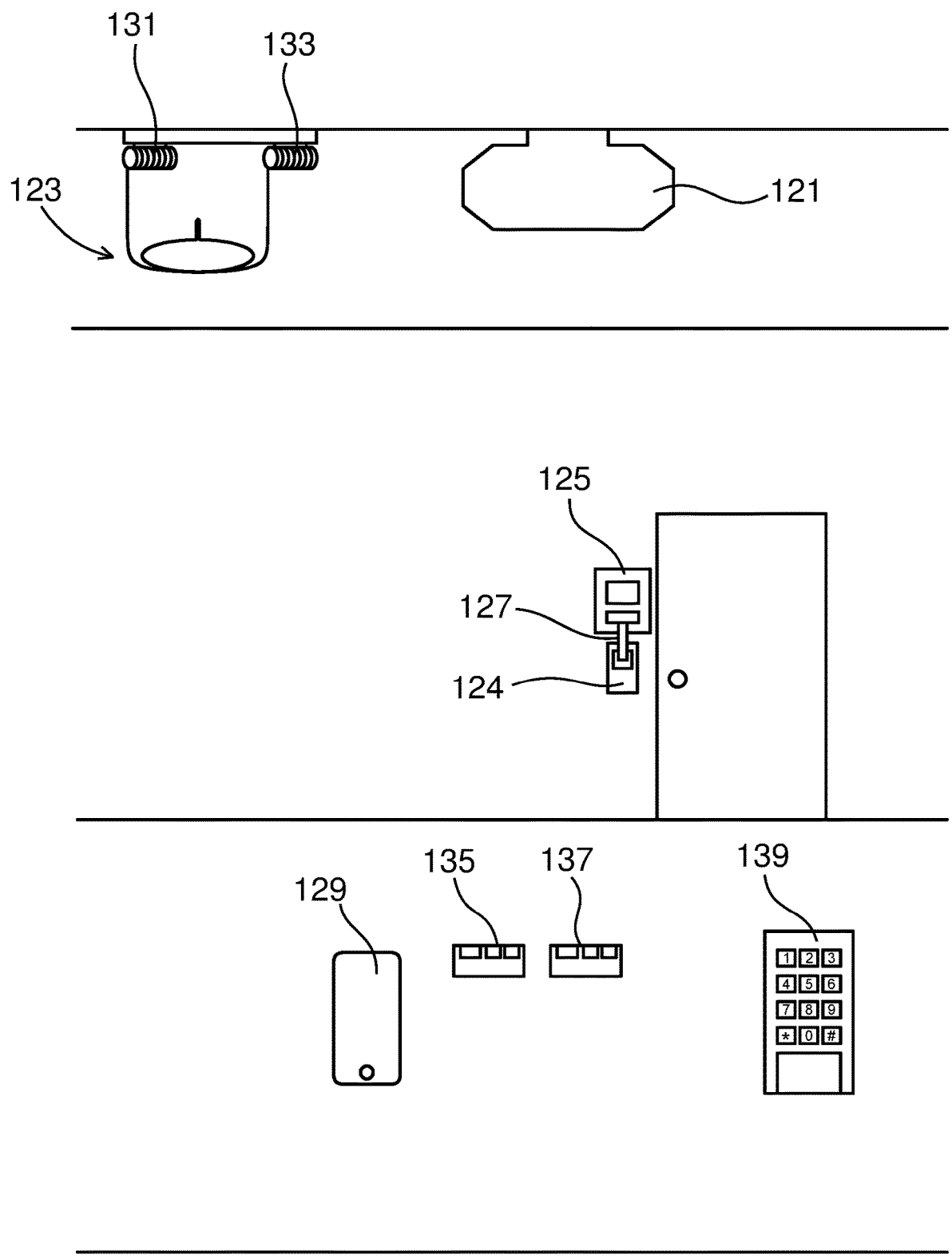
FIG. 3 is a view of a garage with an adapter kit for the garage door opening and lifter storage system.

FIG. 3 is a view inside a garage equipped with a surfboard lifter 123 and an overhead door opening machine 121 that is not part of the GarageSmart® system. The garage door opening machine 121 is controlled by hardwired wall mounted button 124. To allow this garage door opening machine 121 to open only when a lifter is not in the lowered position a unique solution was conceived. A control box 125 with articulated finger 127 is attached to the wall above the wall mounted button 123. The articulated finger 127 is a bar attached to the control box 125, that presses the wall mounted button 123 when instructed by the control box 125. The control box 125 communicates with the rest of the system and ensures that the garage door is only opened when safe to do so. The control box 125 also becomes the wall mounted button, as well as the control for whether the system will open the garage door or not.

The control box 125 connects wirelessly to the other devices such as the lifting devices 131 and 133 of the surfboard lifter 123. The control box 125 also communicates with the remote opening devices such as remote garage door openers 135 and 137, smartphone 129, and wireless numeric keypad 139. To ensure that the surfboard lifter 123 is safely operated with the garage door it is best to replace all remote garage door openers, and numeric keypads from the original system with remote garage door openers, numeric key pads, and apps from the GarageSmart® system. If remote garage door openers, smartphone apps, or numeric keypads from the original system are used they could damage the lifters or harm those using the lifters.

The remote garage door openers 135 and 137, smartphone with opening app 129, and numeric keypad 139 of the GarageSmart® system may in some embodiments all communicate with the control box 125. For this system utilizing the control box, when the button on the remote garage door opener 135 is pressed a signal is sent to the control box 125, which sends a signal to the lifting devices 141 and 143 of the surfboard lifter 123. The signal includes a query regarding the lines of the lifting devices 141 and 143. If the lines of the lifting devices 141 and 143 are spooled in completely or spooled into a high set point the processor of the control box instructs the articulated finger 127 to press the button on the wall mounted button 124. This causes the garage door opening machine 121 to open the garage door. If the lifting devices 141 and 143 had responded that the lines were at a low set point or any location other than the high set point or completely spooled in the processor of the control box 125 would not have instructed the articulated finger 127 to press the button of the wall mounted button 124 and the garage door opening machine 121 would not have opened the garage.

The system works in the other direction as well. The surfboard lifter (or one of the many other lifters available) is preferably controlled remotely via an app on a smartphone. In other embodiments a dedicated remote control device is used. To lower surfboard lifter a virtual button is pushed on a smartphone. The smartphone sends a signal to the control box to determine the location of the door. The processor of the control box stores in memory whether the garage door is open or closed. When the control box receives the signal querying the location of the garage door it responds to the app on the smartphone the location of the garage door. If the garage door is open the app on the smartphone will send another signal instructing the lifting devices to not lower the surfboard lifter. Alternatively, if the control box indicates that the garage door is closed the app on the smartphone will instruct the lifting devices to lower the surfboard lifter.

The embodiment of the system described herein has depicted a single surfboard lifter. The system is capable of utilizing multiple lifters. There are various lifters available from GarageSmart®.

In some embodiments the garage door opener 121 is not in communication with the lifting devices and is only connected to the processes of the present disclosure via the articulating finger 127. In cases where a conventional garage door opener is used that does not have memory or sensing or other capabilities to communicate with the lifters or any other of the components described herein, the articulating finger 127 can be the only link between the lifter and the garage door. If a user installs the lifters and does not wish to install a new garage door opener, the following can be done to avoid interference without having to change anything about the garage door opener. The control box 125 can know the position of the lifter using telemetry, sensing, and memory stored on the control box 125, and the only missing piece of information may be the position of the garage door. In nearly all cases the garage door is either up, down, or moving between these positions. The control box 125 can assess the position of the garage door from the presses of the button. If down, a press moves the garage door up; if up, a press moves the garage door down. If there is an unusual circumstance in which the door is moved erratically, the control box can be reset using a button 119 on the control box 125 that is simply labeled: "reset when door is down." The control box 125 can reset the position of the door when the button is pressed.

Figure 4:
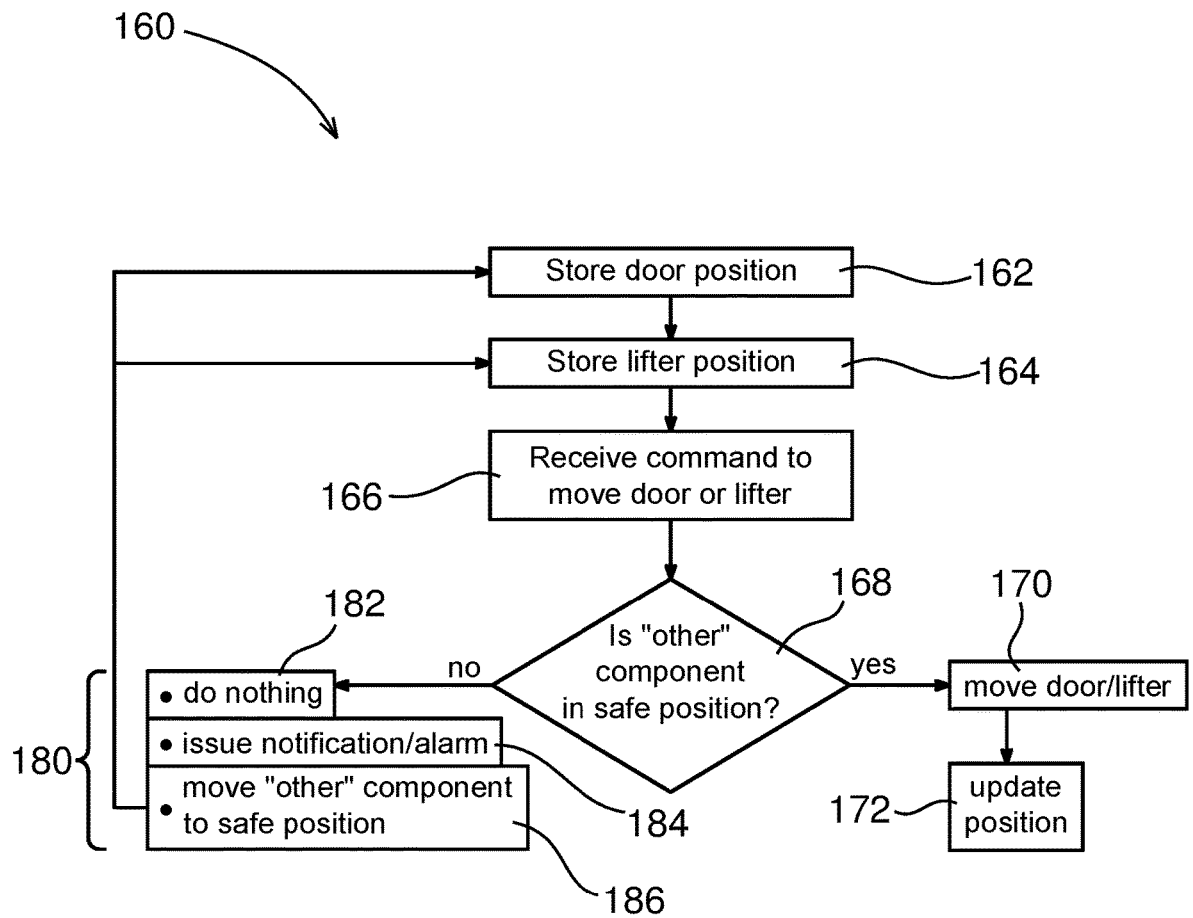
FIG. 4 is a flowchart depicting a method of operating a lifter and an overhead door in concert without interference according to embodiments of the present disclosure.

FIG. 4 is a flowchart depicting a method 160 of operating a lifter and an overhead door opener in concert without interference according to embodiments of the present disclosure. At 162 the position of the door is stored either in memory of the garage door opener or in a remote operating device or a smartphone or other computing device. The position of the lifter is similarly stored at 164. The position of these components can be determined based on encoders, optical sensors, cameras, rheostats, or virtually any other suitable position sensing and monitoring device. At 166 a command is received to move the door or the lifter. For purposes of explanation and not limitation, the method 160 is described in the scenario of the door being requested to move initially. However, it is to be understood that the method can operate with the command being to move the lifter, and a similar method can be executed as will become clear in the present disclosure. At 166 a command is received to open the garage door, such as by clicking a remote control in a car when arriving home. At 168 a check is performed for whether or not the command can be executed. The check at 168 is for whether or not the "other" component (in this case, the lifter) is in a safe position to allow the door to be opened. In some embodiments this means the lifter is up out of the way of the door, but there may be other conditions in which the lifter is not prepared for the garage door to open, even when components are out of the way. In some embodiments the paths of the two objects described above with respect to FIG. 2 are compared to determine whether or not the command can be carried out. The "other" component in this example is the lifter, but if the command is to operate the lifter initially, the "other" component is the garage door.

If the command is received when the "other" component is moving, the method includes waiting until the movement is stopped and the position of the moving component can be properly recorded.

If the "other" component is in a safe place, then at 170 the command can be honored and the door can be moved, after which time at 172 the position of the "other" component can be updated and this information can be delivered to the memory or whatever component is storing this information at 162. If, however, the "other" component is not in a safe place, at 180 one or more of several actions can be carried out. At 182 the system can do nothing. The user can manually move things and try again. At 184 a notification or alarm can be issued which can be anything from a beep, to a text message, to an email, a light, or any other suitable notification to alert the user that the command cannot be executed because the lifter is in the way. At 186 in some embodiments the lifter which is in the way of the garage door can be commanded to move out of the way. In some embodiments this includes warning the user that the action is taking place and giving the user an opportunity to ensure that the lifter can be raised without damaging anything. A confirmation can be required. In some embodiments the lifter itself is equipped with safety measures which will prevent a lift that will damage things, in which case these built-in safety measures can allow or prevent the automatic raising of the lifter to allow the door to close.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A system, comprising:
   an overhead door opener configured to raise and lower an overhead door in response to receiving a command to open or close the overhead door, wherein the overhead door is movable between a retracted position and a deployed position, wherein the retracted position is above and behind the deployed position;
   a lifter positioned above the overhead door when the overhead door is in the retracted position, wherein the lifter is configured to raise and lower an object along a path that would intersect with a portion of the overhead door when the overhead door is in the retracted position; and
   a controller configured to monitor:
      a position of the overhead door along a first path;
      a position of the lifter along a second path, wherein the first and second path intersect;
   wherein the controller is configured to:
      receive a command to move one of the lifter or the overhead door;
      before executing the command, checking the position of one of the overhead door and the lifter to determine whether or not executing the command will cause interference between the overhead door and the lifter; and
      based, at least in part, upon the interference, executing the command.

2. The system of claim 1, wherein the controller is further configured to move the lifter to a position in the second to avoid the interference and to execute the command with no further input.

3. The system of claim 2 wherein the controller is configured to require confirmation before moving the lifter.

4. The system of claim 2, wherein the controller is configured to move the overhead door to a position in the first path to avoid the interference and to execute the command with no further input.

5. The system of claim 4 wherein the controller is configured to require confirmation before moving the overhead door.

6. The system of claim 1 wherein the controller is integrated into the overhead door opener.

7. The system of claim 1 wherein the controller is separate from the overhead door opener but connected via wireless or wired electronic connections.

8. The system of claim 1, further comprising an articulating finger coupled to the controller, wherein the articulating finger is positioned relative to a button on the overhead door opener and configured to actuate to mechanically depress the button when the controller desires to open the overhead door.

9. The system of claim 8 wherein the controller and overhead door opener have no electronic communications and interact only by the articulating finger.

10. The system of claim 9 wherein the controller further comprises a reset button to instruct the controller of a position of the overhead door, and wherein the controller is further configured to store a position of the overhead door in memory based on a number of presses of the button via the articulated finger.

11. The system of claim 1 wherein if the position of the overhead door and lifter are not suitable to avoid interference, the controller is configured to issue a notification to a source of the command.

12. The system of claim 1 wherein the overhead door comprises a door panel and two tracks on either side, wherein the tracks carry the door panel and define an area through which the lifter is designed to pass when the lifter raises and lowers the object.

13. A kit comprising:
   a lifter comprising a powered lifting device and associated hoisting and connection equipment configured to suspend an object other than an overhead door, wherein the lifting device is configured to raise and lower the object in response to commands;
   a controller configured to monitor a relative position of the overhead door and the lifter to prevent interference between the overhead door and the lifter, the controller being located near a button on an overhead door opener, the controller further comprising an articulating finger configured to manually depress the button to raise and lower the overhead door, and wherein the controller is configured to receive a remote request to open the overhead door, and in response to the request the controller moves the overhead door if the lifter is not in an impeding position relative to the overhead door, and wherein the controller moves the overhead door by mechanically actuating the articulating finger to depress the button.

14. The kit of claim 13 wherein the controller does not electronically communicate with the overhead door opener.

15. The kit of claim 13 wherein the controller is configured to electronically communicate with the overhead door opener to assess a position of the overhead door.

16. The kit of claim 13 wherein the controller is configured monitor a position of the door based on a number of presses of the button, and wherein the controller further comprises a reset button that, when pressed, informs the controller of a position of the door.

* * * * *